2,733,980
Patented Feb. 7, 1956

2,733,980

PRECIPITATION OF SODIUM HEXAVANADATE

Adolph Q. Lundquist, Grand Junction, Colo., assignor to Union Carbide and Carbon Corporation, a corporation of New York No Drawing. Application November 19, 1952,
Serial No. 321,519

2 Claims. (Cl. 23—19)

This invention relates to the treatment of solutions containing vanadium and has for its principal object an improved method of precipitating a vanadium compound from such solutions which results in good recovery of vanadium in a much shorter time than conventional methods require.

In the treatment of vanadium ore materials by conventional methods for recovery of vanadium therefrom aqueous solutions containing vanadium compounds are often produced. For example, the ore may be roasted with salt, and the roasted mixture (the "calcine") washed with water to produce such a solution. In conventional treatment methods sulfuric acid is added to these solutions to precipitate a vanadate salt, and the precipitate is removed by filtration, washed and dried.

The proportion of vanadium in such solutions has a critical bearing on its percentage recovery from solution. If the vanadium content is less than about 1.5% calculated as vanadium pentoxide ($V_2O_5$) it is difficult to recover all of the vanadium from solution. On the other hand, if the vanadium content much exceeds about 2.5% calculated as $V_2O_5$, calcium, always present as an impurity in solutions of this type is precipitated along with the vanadium in undesirable quantities as calcium sulfate. Even when the vanadium content of the solution is within the range 1.5% to 2.5%, however, difficulty is encountered in precipitation, filtration and washing due to the nature of the precipitate which forms a difficultly filtrable slime. Consequently in the ordinary operation precipitation time alone is of the order of six to eight hours or even longer. These difficulties of course substantially raise the cost of operation.

By the present invention precipitation time is substantially reduced; precipitation time is consistently reduced to about one hour or even less. The invention is a method of treating an aqueous solution containing vanadium compounds which comprises adjusting the concentration of sodium salts such as sodium chloride or sodium sulfate of such solution to about 5% to 20%, preferably 15% to 20%; heating the solution to a temperature not above its boiling point and preferably at least to 75° C.; acidifying with sulfuric acid to a pH of 1 to 4, preferably 2 to 3; and agitating the solution until precipitation is complete.

In practicing the method of the invention the concentration of sodium salt in the solution to be treated may be increased simply by the addition of the required quantities of salt. However, it is most economically and conveniently accomplished in conjunction with a salt roasting operation by recirculating the wash liquors through the calcined ore material. Recirculaiton not only builds up the concentration of soluble vanadium compounds in the liquor and the concentration of sodium salts but also tends to cause the precipitation of calcium sulfate in the insoluble residue instead of carrying this undesirable impurity into the product.

The advantages of the invention and a typical example of its practice can best be realized by a comparison of the treatment of a solution by conventional methods and by the method of the invention. Whereas a solution containing 1.52% vanadium as $V_2O_5$ required 8 hours and 25 minutes for precipitation upon the addition of sulfuric acid in conventional manner in a proportion of 0.5 pound of acid per pound of $V_2O_5$, the vanadium in a similar solution which had been treated in accordance with the invention was precipitated in 1 hour and 13 minutes. In both cases the starting solution was heated to about 85° to 90° C. prior to the acid addition. In the solution treated in accordance with the invention the sodium salt concentration was built up to 9.75% NaCl and 8.55% $Na_2SO_4$ but in the solution treated in conventional manner the aggregate concentration of these salts was well below 5%. The pH of the conventionally treated solution was 1.85 after the acid addition; the pH of the solution treated in accordance with the invention was 2.05 after the acid addition. Not only was the vanadium precipitated from the latter solution in slightly less than one-sixth of the time required for precipitation in the former solution but also the vanadium content of the filtrate was less, being 0.01% in the filtrate derived from the latter solution and 0.025% in the filtrate derived from the former solution. Even more important, the sulfur content of the precipitate derived from conventional treatment was 0.25% whereas that of the precipitate obtained by the method of the invention was only 0.085%.

Thus the invention provides a quicker precipitation of vanadium than is attained by conventional methods and produces a more pure product.

While the invention has been described with particular reference to the treatment of solutions derived from a specific treatment for vanadium-containing ore materials, it is of course applicable to the treatment of similar solutions however derived.

What is claimed is:

1. In the method of treating a vanadium ore material which comprises roasting such ore material with salt, washing the roasted ore material with water to dissolve water-soluble vanadium compounds and precipitating a vanadate from the wash liquor by the addition of sulfuric acid thereto, the improvement which comprises recirculating said wash liquor through said roasted ore material until the aggregate concentration of sodium chloride and sodium sulfate in said liquor is 5% to 20% by weight; heating said liquor to an elevated temperature not above its boiling point; and adding sulfuric acid to the entire hot solution until its pH is about 2 to 3, thereby precipitating sodium hexavanadate from such liquor.

2. In the method of treating a vanadium ore material which comprises roasting such ore material with salt, washing the roasted ore material with water to dissolve water-soluble vanadium compounds and precipitating a vanadate from the wash liquor by the addition of sulfuric acid thereto, the improvement which comprises recirculating said wash liquor through said roasted ore material until the aggregate concentration of sodium chloride and sodium sulfate in said liquor is 10% to 20% by weight; heating said liquor to an elevated temperature of at least about 75° C. but not above its boiling point; and adding sulfuric acid to the entire hot solution until its pH is about 2 to 3, thereby precipitating sodium hexavanadate from such liquor.

References Cited in the file of this patent

UNITED STATES PATENTS

| 1,392,745 | Copelin | Oct. 4, 1921 |
|---|---|---|
| 1,393,748 | Carpenter et al. | Oct. 18, 1921 |
| 1,531,541 | Carpenter | Mar. 31, 1925 |
| 1,554,917 | Kunkle | Sept. 22, 1925 |
| 2,479,905 | Cole et al. | Aug. 23, 1949 |
| 2,551,733 | Dunn et al. | May 8, 1951 |